United States Patent
Wei

(10) Patent No.: US 11,461,255 B2
(45) Date of Patent: Oct. 4, 2022

(54) ELECTRONIC DEVICE, NETWORK SWITCH, AND INTERRUPT TRANSMITTING AND RECEIVING METHOD

(71) Applicant: REALTEK SEMICONDUCTOR CORPORATION, Hsinchu (TW)

(72) Inventor: Wei-Yi Wei, Tainan (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/063,745

(22) Filed: Oct. 6, 2020

(65) Prior Publication Data

US 2021/0117351 A1 Apr. 22, 2021

(30) Foreign Application Priority Data

Oct. 21, 2019 (TW) ................................. 108137821

(51) Int. Cl.
*G06F 13/24* (2006.01)
*H04L 49/351* (2022.01)

(52) U.S. Cl.
CPC ............ *G06F 13/24* (2013.01); *H04L 49/351* (2013.01)

(58) Field of Classification Search
CPC ................................ G06F 13/24; H04L 49/351
See application file for complete search history.

(56) References Cited

U.S. PATENT DOCUMENTS

| 6,215,789 | B1 * | 4/2001 | Keenan | ................... H04L 47/13 370/399 |
| 9,521,094 | B2 | 12/2016 | Chiu | |
| 10,043,492 | B2 | 8/2018 | Woo et al. | |
| 10,963,419 | B1 * | 3/2021 | Chin | ..................... G06F 11/349 |

(Continued)

FOREIGN PATENT DOCUMENTS

| CN | 101556569 A | 10/2009 |
| TW | 200840356 A | 10/2008 |

(Continued)

OTHER PUBLICATIONS

Coleman, James (2009). "Overview of Interrupt Delivery Methods, Legacy XT-PIC Interrupts, XT-PIC Limitations". Reducing Interrupt Latency Through the Use of Message Signaled Interrupts (PDF). Intel Corporation. p. 10.

(Continued)

*Primary Examiner* — Phong H Dang
(74) *Attorney, Agent, or Firm* — WPAT, PC

(57) ABSTRACT

An electronic device, a network switch and an interrupt transmitting and receiving method are provided. The electronic device includes a slave chip and a main chip. The slave chip is configured to generate a plurality of data segments and at least one interrupt message and includes an encoder. The encoder is configured to encode the data segments and the interrupt message to generate a digital data. The interrupt message is arranged between the data segments. The main chip, which is coupled to the slave chip, is configured to receive the digital data and includes a decoder and a control circuit. The decoder is configured to (Continued)

decode the digital data to obtain the data segments and the interrupt message. The control circuit is coupled to the decoder and is configured to process the interrupt message.

9 Claims, 4 Drawing Sheets

(56) References Cited

U.S. PATENT DOCUMENTS

| | | | | |
|---|---|---|---|---|
| 2009/0259786 | A1* | 10/2009 | Lin | G06F 13/4027 710/110 |
| 2014/0177642 | A1* | 6/2014 | Chiu | H04L 49/351 370/401 |
| 2015/0199287 | A1* | 7/2015 | Sengoku | G06F 13/4068 710/110 |
| 2016/0329033 | A1* | 11/2016 | Woo | G09G 3/20 |
| 2018/0285292 | A1* | 10/2018 | Amarilio | G06F 13/24 |

FOREIGN PATENT DOCUMENTS

| | | | |
|---|---|---|---|
| TW | 200912648 | A | 3/2009 |
| TW | 201427328 | A | 7/2014 |
| TW | 201640473 | A | 11/2016 |
| TW | 201841530 | A | 11/2018 |

OTHER PUBLICATIONS

OA letter of the counterpart TW application (appl. No. 108137821) dated Dec. 22, 2020. Summary of the OA letter: (1) Claims 1-3 and 5-10 are rejected under Patent Law Article 22(2) as being unpatentable over reference 1 (TW 201427328A) and reference 2 (TW 200912648A). (2) Claim 4 is rejected under Patent Law Article 22(2) as being unpatentable over reference 1 (TW 201427328A), reference 2 (TW 200912648A) and reference 3 (TW 200840356A). OA letter ot the counterpart TW application (appl. No. 108137821) dated May 13, 2021. Summary of the OA letter: (1) Claims 1-3 and 5-10 are rejected under Patent Law Article 22(2) as being unpatentable over reference 1 (TW 201427328A) and reference 2 (CN 101556569A). (2) Claim 4 is rejected under Patent Law Article 22(2) as being unpatentable over reference 1 (TW 201427328A), reference 2 (CN 101556569A), and reference 3 (TW 201640473A). OA letter of the counterpart TW application (appl. No. 108137821) dated Sep. 6, 2021. Summary of the OA letter: (1) Claim(s) 1-3 and 5-7 is/are rejected under Patent Law Article 22(2) as being unpatentable over reference 1 (TW 201841530A) and reference 2 (CN 101556569A). (2) Claim(s) 4 and 8-10 is/are rejected under Patent Law Article 22(2) as being unpatentable over reference 1, reference 2 and reference 3 (TW 201427328A).

* cited by examiner

ELECTRONIC DEVICE, NETWORK SWITCH, AND INTERRUPT TRANSMITTING AND RECEIVING METHOD

BACKGROUND OF THE INVENTION

1. Field of the Invention

The present invention generally relates to interrupt handling, and, more particularly, to the transmission and reception of interrupts.

2. Description of Related Art

FIG. 1 is a functional block diagram of a conventional electronic device. The electronic device 100 includes a main chip 110 and multiple slave chips 120. The main chip 110 includes multiple interrupt pins 116, multiple data pins 118 and a control pin 119. Each slave chip 120 includes an interrupt pin 122, a data pin 124 and a control pin 126. The slave chip 120 is responsible for a part of the work that the electronic device 100 processes, and the slave chip 120 transmits data to the main chip 110 through the data pin 124 and the data pin 118. Upon detecting an interrupt event, the slave chip 120 generates an interrupt notification and transmits the interrupt notification to the main chip 110 through the interrupt pin 122 and the interrupt pin 116. The interrupt event is, for example, data abnormality or circuit abnormality. The control circuit 112 of the main chip 110 receives the interrupt notifications through the bus 114. The interrupt notification transmitted from the slave chip 120 does not contain an interrupt source and is used only to notify the main chip 110 of the occurrence of an interrupt event. The interrupt source is used to indicate the type of the interrupt event or to provide details of the interrupt event. In general, after receiving the interrupt notification, the main chip 110 cannot decide how to handle the interrupt event unless the interrupt source is known. Inside the conventional electronic device 100, the interrupt source cannot be transmitted through the interrupt pin 116 and the interrupt pin 122. As a result, the control circuit 112 is required to read the interrupt source from the slave chip 120 through the control pin 119 and the control pin 126. The interrupt source may be stored in the register of the slave chip 120.

Consequently, the electronic device 100 has the following disadvantages: (1) the interrupt pins causing increases in the circuit cost, in the difficulty of circuit design and in the complexity of the circuit layout on the circuit board; and (2) reading the interrupt source from the slave chip 120 imposing additional load on the control circuit 112. These disadvantages become more significant as the number of slave chips 120 increases.

SUMMARY OF THE INVENTION

In view of the issues of the prior art, an object of the present invention is to provide an electronic device, a network switch, and an interrupt transmitting and receiving method to address the conventional problems.

An electronic device is provided. The electronic device includes a slave chip and a main chip. The slave chip is configured to generate multiple data segments and at least one interrupt message and includes an encoder configured to encode the data segments and the interrupt message to generate a digital data. The interrupt message is arranged between the data segments. The main chip is coupled to the slave chip, configured to receive the digital data and includes a decoder and a control circuit. The decoder is configured to decode the digital data to obtain the data segments and the interrupt message. The control circuit is coupled to the decoder and configured to handle the interrupt message.

An interrupt transmitting and receiving method is provided. The method is applied to an electronic device including a slave chip and a main chip. The slave chip includes a first data pin, and the main chip includes a second data pin. The method includes the following steps: generating by the slave chip multiple data segments, wherein an idle interval is present between the data segments; detecting by the slave chip whether an interrupt event occurs and inserting by the slave chip an interrupt message in the idle interval in response to an occurrence of the interrupt event; encoding by the slave chip the data segments and the interrupt message to generate a digital data; transmitting by the slave chip the digital data through the first data pin; receiving by the main chip the digital data through the second data pin; decoding by the main chip the digital data to obtain the interrupt message; and handling the interrupt event.

A network switch is also provided. The network switch includes a port physical layer chip and a main chip. The port physical layer chip includes a first data pin and an encoder and is configured to perform the following steps: generating multiple packets; generating an interrupt message upon a detection of an interrupt event; generating a digital data by using the encoder to encode the packets and the interrupt message; and transmitting the digital data through the first data pin. The main chip includes a second data pin and a decoder. The main chip is coupled to the port physical layer chip through the first data pin and the second data pin and configured to perform the following steps: receiving the digital data through the second data pin; obtaining the packets and the interrupt message by using the decoder to decode the digital data; and handling the interrupt event.

The electronic device and network switch of the present invention and the electronic devices implementing the interrupt transmitting and receiving method provided by the present invention uses fewer interrupt pins but quickly know the interrupt source. In comparison with the conventional technology, the present invention has the following advantages: (1) a reduction in packaging costs; (2) a decrease in the difficulty of the circuit layout on the circuit board to prevent the power/ground plan from being cut; (3) an improvement in the efficiency of interrupt event handling; and (4) a reduction in the load of the control circuit.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an electronic device, a network switch and an interrupt transmitting and receiving method. On account of that some or all elements of the electronic device and the network switch could be known, the detail of such elements is omitted provided that such detail has little to do with the features of this disclosure, and that this omission nowhere dissatisfies the specification and enablement requirements. Some or all of the processes of the interrupt transmitting and receiving method may be implemented by software and/or firmware, and can be performed by the electronic device, the network switch or their equivalents. A person having ordinary skill in the art can choose components or steps equivalent to those described in this specification to carry out the present invention, which means that the scope of this invention is not limited to the embodiments in the specification.

In this document, the term "circuitry" may indicate a system formed with one or more circuits. The term "circuit" may indicate an object, which is formed with one or more transistors and/or one or more active/passive elements based on a specific arrangement, for processing signals. As used herein, the term "and/or" includes any combination of one or more of the listed items.

Although the terms "first," "second," etc., may be used herein to describe various elements, these elements should not be limited by these terms. Rather, these terms are only used to distinguish one element from another. For example, a first element could be termed a second element, and, similarly, a second element could be termed a first element, without departing from the scope of the embodiments.

Figure 1:
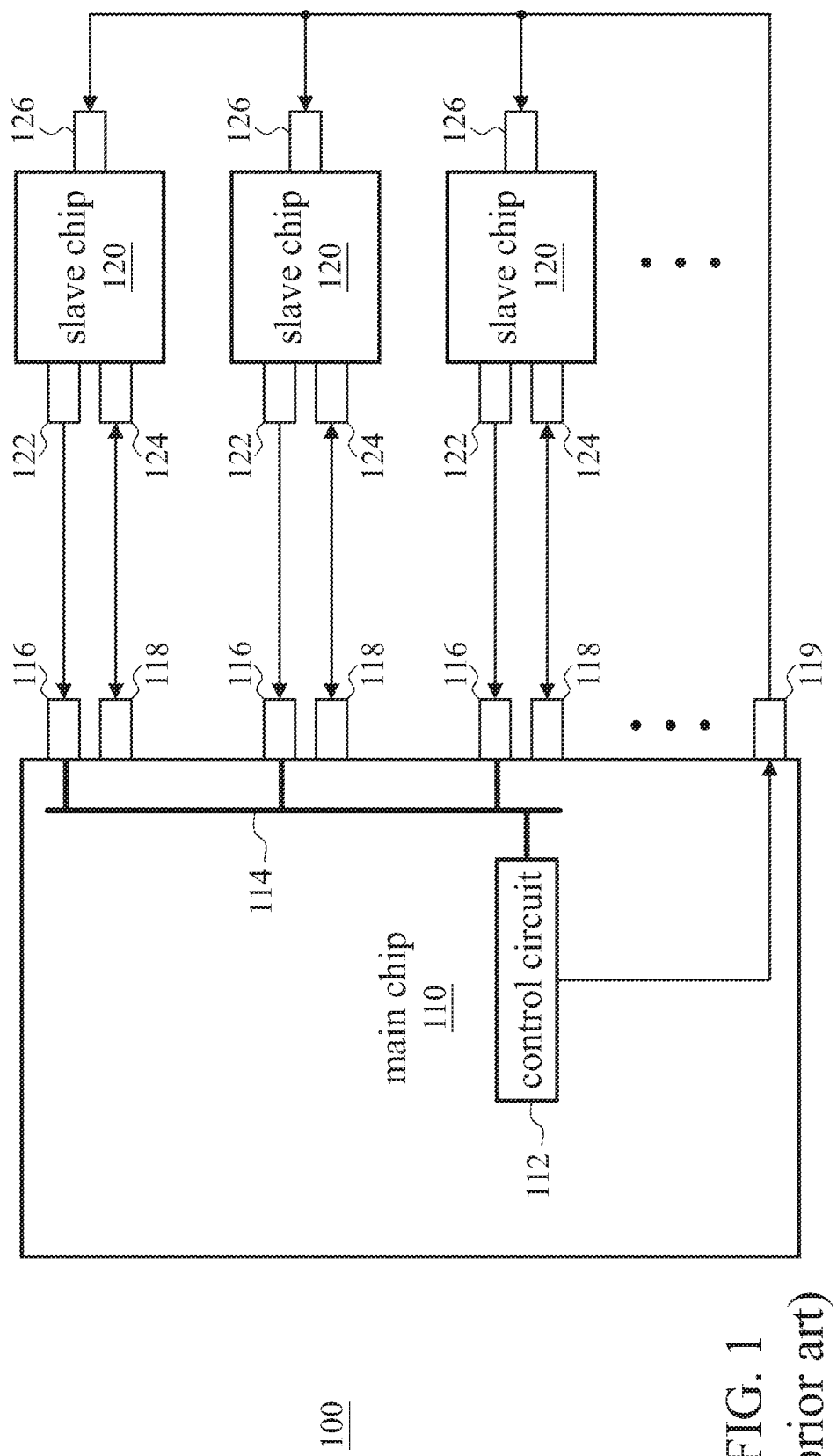
FIG. 1 illustrates a functional block diagram of a conventional electronic device.
Figure 2:
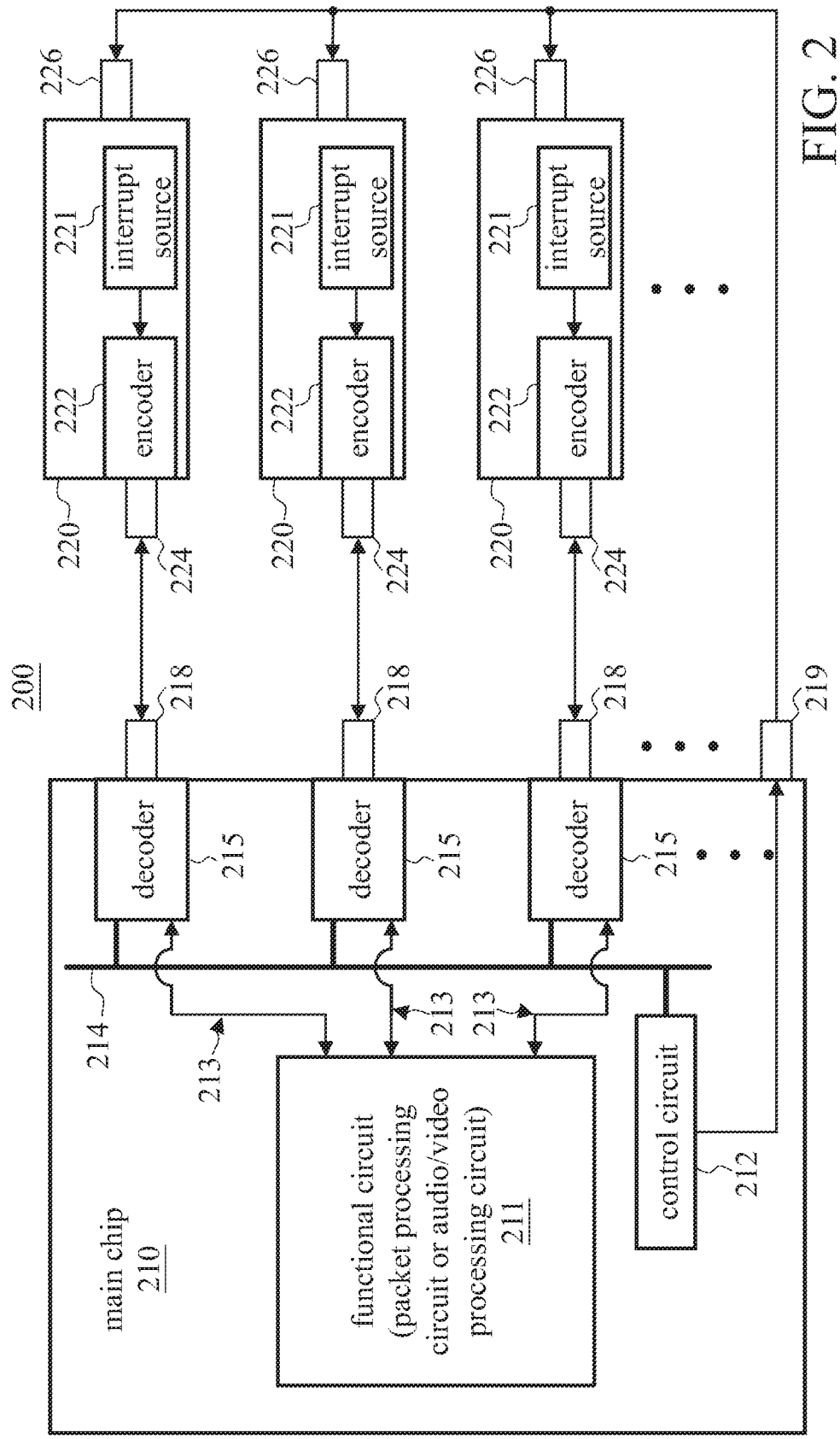
FIG. 2 illustrates a functional block diagram of an electronic device according to an embodiment of the present invention.

FIG. 2 is a functional block diagram of an electronic device according to an embodiment of the present invention. The electronic device 200 includes a main chip 210 and multiple slave chips 220. The main chip 210 includes a functional circuit 211, a control circuit 212, multiple decoders 215, multiple data pins 218 and a control pin 219. The control circuit 212 can be a circuit or an electronic component with program execution capability, such as a central processing unit (CPU), a microprocessor or a micro-processing unit. Each slave chip 220 includes an interrupt source 221, an encoder 222, a data pin 224 and a control pin 226. Each slave chip 220 is coupled to a corresponding decoder 215 through the data pin 224 and the data pin 218.

Figure 3:
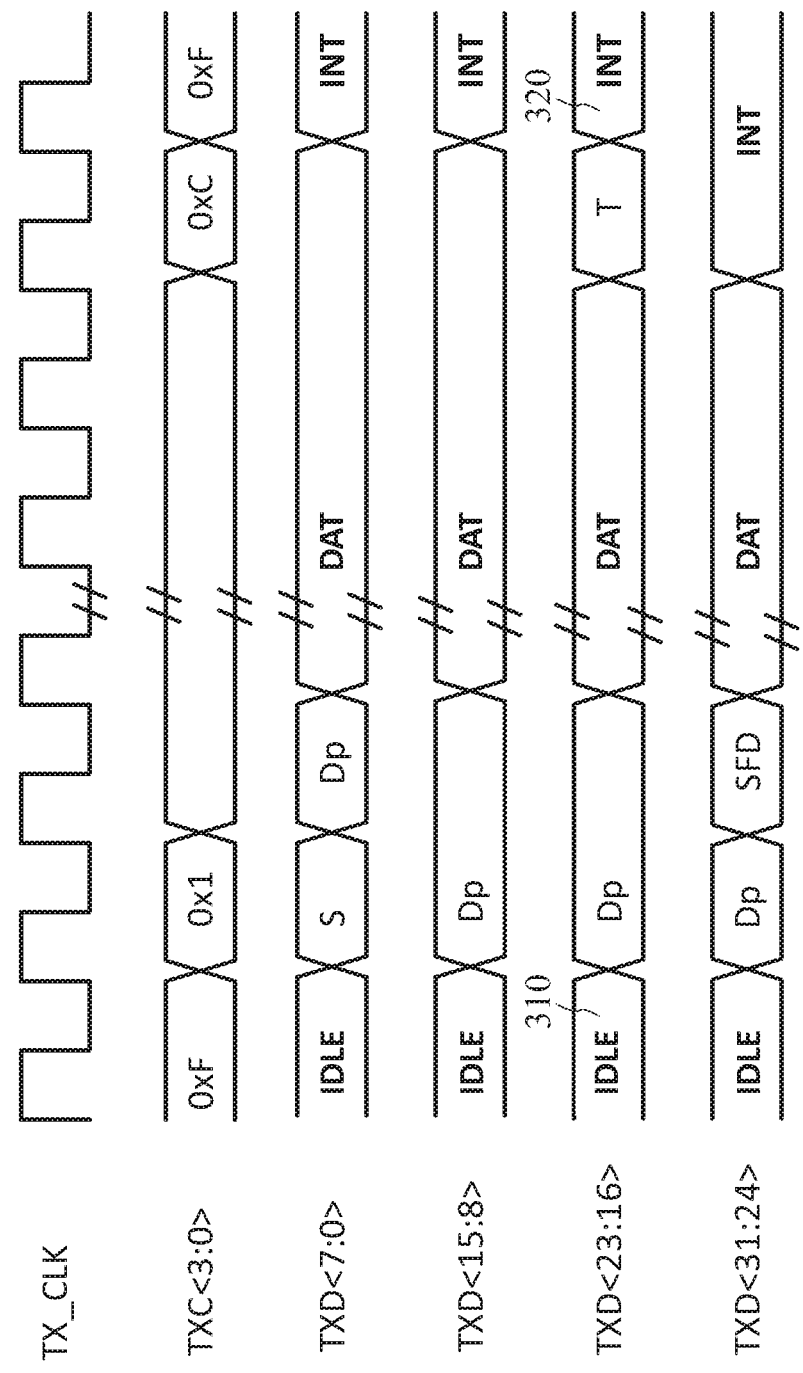
FIG. 3 illustrates an example timing diagram of digital data based on the IEEE802.3 standard.

FIG. 3 is an example timing diagram of the digital data transmitted from the slave chip 220 to the main chip 210 in FIG. 2. The example timing diagram in FIG. 3 is based on the IEEE802.3 standard, and Table 1 shows the meaning of the symbols in FIG. 3. More discussions will be provided below for the symbols related to the present invention, while the details of other symbols which are well known to people having ordinary skill in the art are omitted for brevity.

TABLE 1

| symbol | meaning |
| --- | --- |
| IDLE | idle control character |
| S | start control character |
| Dp | preamble data octec |

TABLE 1-continued

| symbol | meaning |
| --- | --- |
| SFD | start of frame delimiter |
| DAT | data segment |
| T | terminate control character |
| INT | interrupt message |

The IEEE802.3 standard uses four 8-bit data channels TXD (which are TXD<7:0>, TXD<15:8>, TXD<23:16> and TXD<31:24>) to transmit data, and uses a 4-bit auxiliary channel to indicate the content transmitted by the data channel TXD. For example, the auxiliary channel TXC and the first data channel TXD (i.e., TXD<7:0>) can use the following content to indicate that an interval of the first data channel TXD is idle (namely, this interval does not carry any to-be-processed or meaningful data): TXC<0>=$1_2$, TXD<7:0>=$00000111_2$. According to the IEEE802.3 standard, there is always an idle interval (i.e., the interval indicated by the idle control character IDLE) between data segments DAT no matter how busy the system conforming to this standard might be. In other words, there is a data segment DAT (not shown) before the idle control character 310 and a data segment DAT (not shown) after the interrupt message 320. In the IEEE802.3 standard, the idle interval can also be referred to as the inter frame gap.

Figure 4:
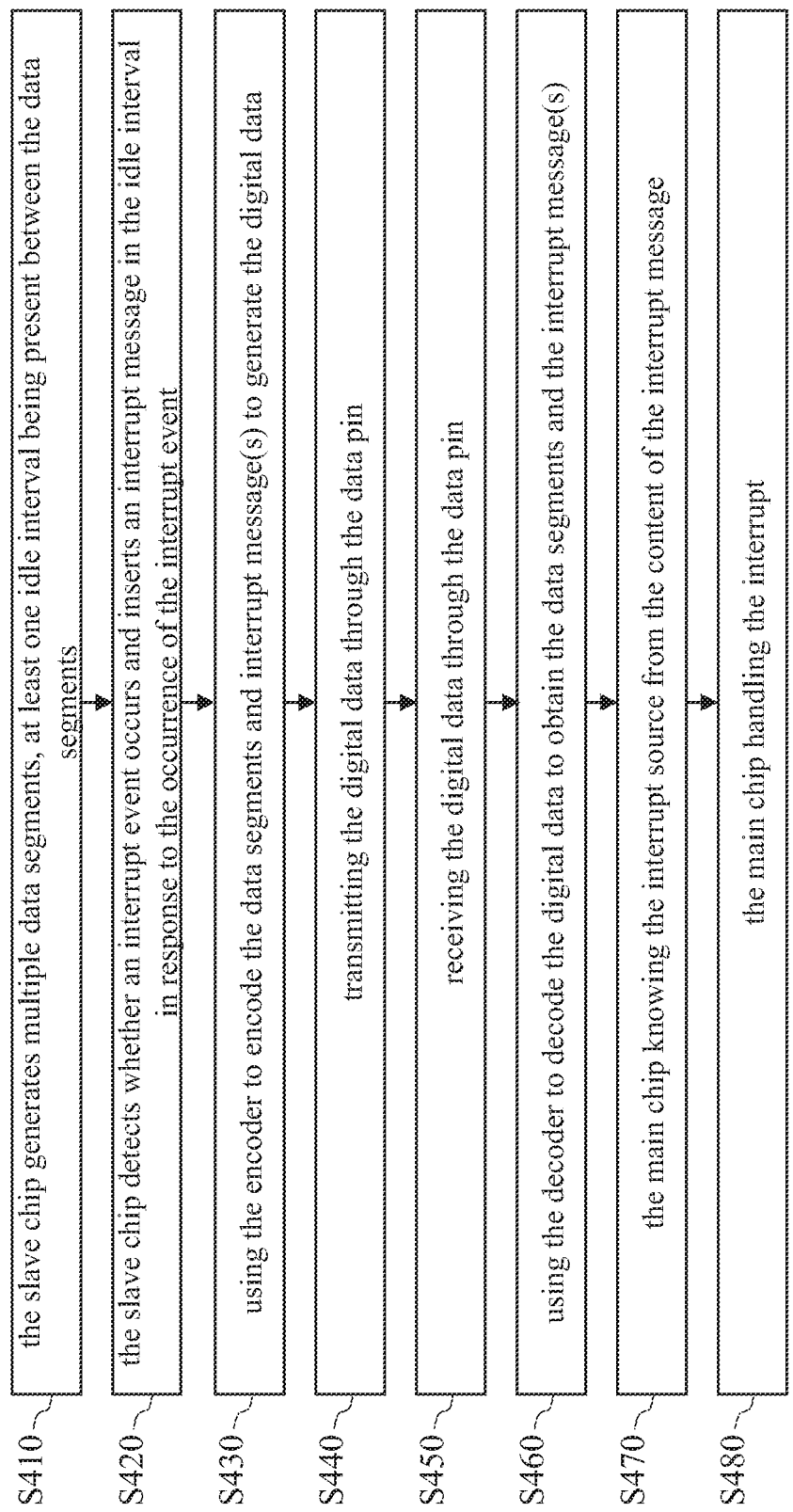
FIG. 4 illustrates a flowchart of an interrupt transmitting and receiving method according to an embodiment of the present invention.

FIG. 4 is a flowchart of an interrupt transmitting and receiving method according to an embodiment of the present invention. Reference is made to FIGS. 2 to 4 for the following discussions.

In Step S410, the slave chip 220 operates according to the clock TX_CLK and generates multiple data segments. At least one idle interval is present between the data segments. When the electronic device 200 is a network switch that conforms to the IEEE802.3 standard, the slave chip 220 may be a Port Physical Layer (hereinafter referred to as PHY) chip, a data segment may be referred to as a packet or a frame, and data transmission between the main chip 210 and the slave chips 220 may be based on the 10GBASE-R configuration. For the details of the 10GBASE-R configuration, please refer to the IEEE802.3 standard.

In step S420, the slave chip 220 detects whether an interrupt event occurs and inserts an interrupt message in the idle interval in response to the occurrence of the interrupt event. In other words, the slave chip 220 uses the idle interval to transmit the interrupt message. The interrupt message can be arranged in the idle interval of any data channel TXD. In other words, the interrupt message can be carried by the idle interval of any data channel TXD. Upon receiving an interrupt message from any data channel TXD, the main chip 210 can know that an interrupt event has occurred. Because the data pins 218 are in one-to-one correspondence with the data pins 224, the main chip 210 can determine from the data pin 218 which slave chip 220 has generated the interrupt message. In addition, in some embodiments, the interrupt message may include the interrupt source. For example, Table 2 shows an example of the interrupt message.

TABLE 2

| type of the interrupt message | TXC<n> | TXD<k + 7: k> |
| --- | --- | --- |
| only interrupt notification included | $1_2$ | $01000000_2$ |
| interrupt event 1 | $1_2$ | $01000001_2$ |
| interrupt event 2 | $1_2$ | $01000010_2$ |
| interrupt event 3 | $1_2$ | $01000011_2$ |
| . . . | . . . | . . . |

In Table 2, (n, k) can be one of the following: (0, 0), (1, 8), (2, 16) and (3, 24). For example, when the content of the received TXD<k+7:k> is 01000000$_2$, the main chip 210 knows that an interrupt has occurs but does not know the type of the interrupt event (e.g., interrupt event 1, interrupt event 2, interrupt event 3, etc.), in which case, the control circuit 212 can read, through the control pin 219 and the control pin 226, the interrupt source 221 (e.g., the register value of the register) in the slave chip 220 which transmits the interrupt message. In another example, when the content of the received TXD<k+7:k> is 01000010$_2$, not only can the main chip 210 know that an interrupt event has occurred, but the control circuit 212 of the main chip 210 can immediately know the type of the interrupt event (i.e., interrupt event 2), which saves the effort (the load) of reading the interrupt source 221 in the slave chip 220 through the control pin 219. For the network switch, the interrupt event may be a link change or speed change, and the control pin 219 and the control pin 226 may communicate with each other through the register access interface (such as the management data control (MDC) and the management data input/output (MDIO)).

In step S430, the slave chip 220 uses the encoder 222 to encode the data segments and interrupt message(s) to generate the digital data. When the electronic device 200 is a network switch that conforms to the IEEE802.3 standard, the encoder 222 performing encoding according to the IEEE802.3 standard (e.g., 10GBASE-R encoding) to generate serial digital data.

In step S440, the slave chip 220 transmits the digital data to the main chip 210 through the data pin 224.

In step S450, the main chip 210 receives the digital data through the data pin 218.

In step S460, the main chip 210 uses the decoder 215 to decode the digital data to obtain the data segments and the interrupt message(s). When the electronic device 200 is a network switch that conforms to the IEEE802.3 standard, the decoder 215 decodes the digital data according to the IEEE802.3 standard (e.g., 10GBASE-R decoding). After the decoding is completed, the functional circuit 211 receives the data segments through the data lines 213 and then processes the data segments, and the control circuit 212 receives the interrupt message through the in-band bus 214. For example, when the electronic device 200 is a network switch, the data line 213 can be a media independent interface (MII), and the functional circuit 211 is a packet processing circuit that processes packets or frames and transfers the packets or frames based on the content of the packets or frames.

In step S470, the main chip 210 knows the interrupt source from the content of the interrupt message. When the interrupt message includes the interrupt source, the control circuit 212 of the main chip 210 can know the interrupt source from the content of the interrupt message. As a result, the control circuit 212 is not required to access the slave chip 220 through the control pin 219, which reduces the load on the control circuit 212 and the main chip 210.

In step S480, the main chip 210 handles the interrupt. More specifically, when the interrupt message includes the interrupt source, the control circuit 212 operates directly in response to the interrupt event indicated by the interrupt source; when the interrupt message does not include an interrupt source, the control circuit 212 first retrieves the interrupt source from the slave chip 220 and then operates accordingly in response to the interrupt event indicated by the interrupt source.

In summary, as the interrupt messages are not transmitted between the main chip 210 and the slave chip 220 through dedicated interrupt pins, there is a reduction in both the cost (i.e., a decrease in the number of pins) and the wiring complexity on the circuit board for the electronic device 200. Furthermore, there is an increase in the operation efficiency of the main chip 210 due to the reduced load on the control circuit 212 of the main chip 210 as a result of using the interrupt message as a carrier for the interrupt source.

In other embodiments, the electronic device 200 is a digital television (TV), in which the slave chip 220 can be a panel control chip, and the functional circuit 211 can be an audio/video (i.e., audio and/or video) processing circuit that processes audio/video data. Video/audio data is transmitted between the panel control chip and the main chip 210 according to the internal DisplayPort (iDP) standard, and the encoder 222 and the decoder 215 respectively encode and decode the audio/video data according to the iDP standard (e.g., 8 B/10 B coding). According to the iDP standard, idle intervals are reserved between any two sets of audio/video data. Therefore, the audio/video data and the interrupt messages can be transmitted through the same pin (i.e., the data pin 224) or received through the same pin (i.e., the data pin 218). In this embodiment, the signal transmission between the control pin 219 and the control pin 226 may be through the Inter-Integrated Circuit (I$^2$C). The iDP standard is well known to people having ordinary skill in the art, and the details thereof are omitted for brevity.

In summary, by arranging the interrupt messages (which may or may not contain interrupt sources) in the gaps or idle intervals in data transmission, the number of interrupt pins is reduced while no extra load is imposed on the system. In addition, the carrying of the interrupt sources by the interrupt messages eases the load on the interrupt-handling circuit (e.g., the control circuit).

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

Although the foregoing embodiments are illustrated by means of network switches and digital televisions, this is not a limitation to the invention. People having ordinary skill in the art may apply the invention to other types of electronic devices in accordance with the disclosure.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device, comprising:
   a slave chip, configured to generate a plurality of data segments, having at least one idle interval indicated by an idle control character, and at least one interrupt message and the slave chip comprising an encoder configured to encode the data segments and the interrupt message to generate a digital data, wherein the interrupt message is inserted in the idle interval between the data segments; and
   a main chip, coupled to the slave chip, configured to receive the digital data, and comprising:
   a decoder configured to decode the digital data to obtain the data segments and the interrupt message;
   a control circuit, coupled to the decoder and configured to handle the interrupt message;
   and an in-band bus, coupled between the decoder and the control circuit and configured to transmit the interrupt message.

2. The electronic device of claim 1, wherein the interrupt message comprises an interrupt source indicative of an interrupt event.

3. The electronic device of claim 1, wherein the electronic device is a network switch, the slave chip is a port physical layer chip, and the data segments are a plurality of packets, the main chip further comprising:
   a packet processing circuit, coupled to the decoder and configured to process and transfer the packets.

4. The electronic device of claim 1, wherein the electronic device is a digital TV, the slave chip is a panel control chip, and the data segments are a plurality of audio/video data, the main chip further comprising:
   an audio/video processing circuit, coupled to the decoder and configured to process the audio/video data.

5. An interrupt transmitting and receiving method applied to an electronic device comprising a slave chip and a main chip, the slave chip comprising a first data pin and the main chip comprising a second data pin, the method comprising steps of:
   generating by the slave chip a plurality of data segments, wherein an idle interval is present between the data segments, and the idle interval is indicated by an idle control character;
   detecting by the slave chip whether an interrupt event occurs and inserting by the slave chip an interrupt message in the idle interval in response to an occurrence of the interrupt event;
   encoding by the slave chip the data segments and the interrupt message to generate a digital data;
   transmitting by the slave chip the digital data through the first data pin;
   receiving by the main chip the digital data through the second data pin;
   decoding by the main chip the digital data to obtain the interrupt message; and
   handling the interrupt event.

6. The method of claim 5, wherein the interrupt message comprises an interrupt source indicative of the interrupt event.

7. A network switch, comprising:
   a port physical layer chip, comprising a first data pin and an encoder and configured to perform following steps:
   generating a plurality of packets having at least one idle interval indicated by an idle control character;
   generating an interrupt message upon a detection of an interrupt event, wherein the interrupt message is inserted in the idle interval between the packets;
   generating a digital data by using the encoder to encode the packets and the interrupt message; and
   transmitting the digital data through the first data pin; and
   a main chip, comprising a second data pin and a decoder, coupled to the port physical layer chip through the first data pin and the second data pin, and configured to perform following steps:
   receiving the digital data through the second data pin;
   obtaining the packets and the interrupt message by using the decoder to decode the digital data; and
   handling the interrupt event.

8. The network switch of claim 7, wherein the interrupt message comprises an interrupt source indicative of the interrupt event.

9. The network switch of claim 7, wherein the main chip further comprises:
   a control circuit, coupled to the decoder and configured to handle the interrupt message; and
   an in-band bus, coupled between the decoder and the control circuit and configured to transmit the interrupt message.

* * * * *